(12) United States Patent
Morita

(10) Patent No.: US 7,427,372 B2
(45) Date of Patent: Sep. 23, 2008

(54) METHOD AND APPARATUS FOR PRODUCING THERMOPLASTIC SYNTHETIC RESIN SHEET OR FILM

(75) Inventor: Keita Morita, Ageo (JP)

(73) Assignee: CTE Co., Ltd. (JP)

( * ) Notice: Subject to any disclaimer, the term of this patent is extended or adjusted under 35 U.S.C. 154(b) by 758 days.

(21) Appl. No.: 10/514,007

(22) PCT Filed: Dec. 1, 2003

(86) PCT No.: PCT/JP03/15320

§ 371 (c)(1),
(2), (4) Date: Nov. 9, 2004

(87) PCT Pub. No.: WO2004/052620

PCT Pub. Date: Jun. 24, 2004

(65) Prior Publication Data

US 2005/0173828 A1    Aug. 11, 2005

(30) Foreign Application Priority Data

Dec. 12, 2002    (JP)    .............................. 2002-361032

(51) Int. Cl.
*B29C 47/88* (2006.01)

(52) U.S. Cl. .................... 264/210.2; 264/280; 425/194; 425/367; 425/373

(58) Field of Classification Search ................. 264/175, 264/210.1, 210.2, 237, 280; 425/193, 194, 425/367, 373
See application file for complete search history.

(56) References Cited

U.S. PATENT DOCUMENTS

| 3,241,182 | A | * | 3/1966 | Kessler | ........................ 425/373 |
| 3,915,612 | A | * | 10/1975 | Gersbeck et al. | ............. 425/373 |
| 4,064,929 | A | * | 12/1977 | Quehen et al. | ............... 425/373 |
| 5,346,385 | A | * | 9/1994 | McAleavey | .................. 425/373 |
| 5,674,442 | A | | 10/1997 | Morita | .................... 264/178 R |
| 6,306,327 | B1 | * | 10/2001 | Fujii et al. | ............... 264/210.2 |

FOREIGN PATENT DOCUMENTS

| EP | 0838321 | 4/1998 |
| JP | 06166089 | 6/1994 |
| JP | 06170919 | 6/1994 |
| JP | 09239812 | 9/1997 |
| JP | 2000280268 | 10/2000 |

* cited by examiner

Primary Examiner—James Mackey
(74) Attorney, Agent, or Firm—Adams & Wilks

(57) ABSTRACT

An apparatus for producing a thermoplastic synthetic resin sheet or film has a casting mechanism having support rollers each mounted to undergo rotation about a corresponding rotational axis and one of which is mounted to undergo non-rotational displacement relative to the other support rollers. A casting sleeve is entrained around the support rollers for rotation therewith. A casting roller is mounted for undergoing rotation relative to the casting sleeve. A synthetic resin material is fed between opposite and confronting outer peripheral surfaces of the casting sleeve and the casting roller while rotating the casting sleeve and the casting roller and while effecting non-rotational displacement of one of the support rollers to holdingly press the synthetic resin material between the casting sleeve and the casting roller and thereby form the synthetic resin material into a thermoplastic synthetic resin sheet or film.

11 Claims, 4 Drawing Sheets

F I G. 1
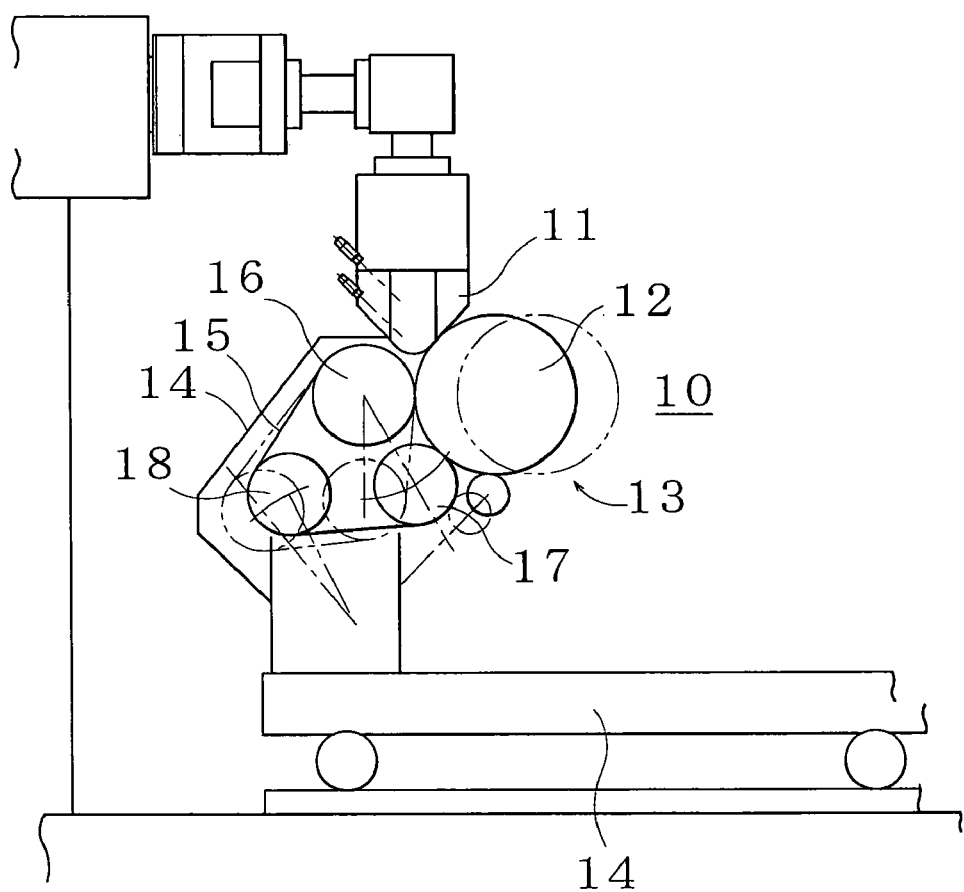

METHOD AND APPARATUS FOR PRODUCING THERMOPLASTIC SYNTHETIC RESIN SHEET OR FILM

CROSS-REFERENCE TO RELATED APPLICATIONS

This application is a U.S. national state application of copending International Application Ser. No. PCT/JP03/15320, filed Dec. 1, 2003 claiming a priority date of Dec. 12, 2002, and published in a non-English language.

BACKGROUND OF THE INVENTION

1. Technical Field

The present invention relates to a method for producing a thermoplastic synthetic resin sheet or film, by which a thin sheet of a thermoplastic synthetic resin is continuously formed and the surface thereof is made smooth and mirror finished. The present invention also relates to an apparatus for producing the thermoplastic resin sheet or film.

2. Background Art

An example of a known apparatus for producing a thermoplastic resin is disclosed in JP-A-6-170919. This publication describes a method for producing a thermoplastic synthetic resin sheet or film, wherein at the downstream side of an extrusion nozzle of a T-die, a cast drum and a first metal roll located at the upstream side of the cast drum are provided as a set for receiving a thermoplastic synthetic resin extruded from this nozzle into the gap thereof. The peripheral surface of the first metal roll is coated with rubber or an elastomer having an elasticity. At the downstream side of the closest point of the cast drum and the first metal roll, a second metal roll facing the peripheral surface of the cast drum is provided. Between these two metal rolls and a third metal roll, a metal endless belt is entrained with a constant tension. With the coated metal roll, the metal endless belt is pressed against the cast drum. In a section between the first and second metal rolls, the metal endless belt runs along the peripheral surface of the cast drum. Between these two metal rolls, a film-like thermoplastic synthetic resin extruded in a molten state from the T-die is nipped and pressed in an arcuate form with use of the cast drum and the metal endless belt having corrosion resistance, and cooled and formed into a sheet-like shape. Further, as an apparatus for practicing this production method, this publication describes an apparatus for producing a thermoplastic synthetic resin sheet or film, wherein at the downstream side of an extrusion nozzle of a T-die, a cast drum and a first metal roll located at the upstream side of the cast drum, are provided as a set for receiving a thermoplastic synthetic resin material extruded from this nozzle into the gap thereof. The first metal roll is provided so that it moves close to or away from the cast drum. At the downstream side of the closest point of the cast drum and the first metal roll, a second metal roll facing the peripheral surface of the cast drum is provided. Between these two metal rolls and a third metal roll, a metal endless belt is entrained with a constant tension. In a section between the first and second metal rolls, the metal endless belt has a flexibility so that it runs along the peripheral surface of the cast drum. The the surface of the first metal roll for nipping and pressing the metal endless belt against the cast drum is coated with a heat-resistant rubber or an elastomer having an elasticity.

Further, JP-A-7-40370 describes an apparatus for producing a synthetic resin sheet, in which a synthetic resin material continuously supplied and fed from a die is cool-pressed with a casting mechanism having a casting roller to cast a synthetic resin sheet in a predetermined thickness. The casting mechanism of this production apparatus comprises a casting roller rotatably supported on a casting base block; a casting belt means for casting a molten synthetic resin material supplied from the die into a predetermined thickness which circulates in contact with the outer peripheral surface of the casting roller and moves in cooperation with the casting roller; and a pressing allowance-adjusting means for adjusting the pressing force of the surface of the casting belt means against the outer peripheral surface of the casting roller; wherein the casting belt means is constituted by a casting belt entrained around and between a pair of belt rollers supported by a slide frame while adjusting the distances in the upward, downward, frontward and rearward directions, and the casting belt is located so that it faces the outer peripheral surface of the casting roller along the outline of the outer peripheral surface of the casting roller, whereby a molten synthetic resin material fed is pressed to form a thin sheet-like product made of the synthetic resin.

By using the apparatus indicated in the above-mentioned JP-A-6-170919, it becomes possible to produce a glossy thermoplastic synthetic resin sheet or film. However, the spans between the third metal roll and the two metal rolls are long, the metal endless belt entrained between the metal rolls with a constant tension is too long, and spots are formed on the produced thermoplastic synthetic resin sheet or film due to welded joints of the metal endless belt and scars generated by corrosion partially on the metal endless belt, whereby it will be required to replace the metallic belt with new one. For such purpose, however, a few persons (usually from 4 to 6 persons) and substantial time are required to detach the long metal endless belt from the metal roll having a large diameter for replacement, whereby the cost of this production apparatus is increased. In addition, since this apparatus is large in size, a small-size apparatus with low cost is demanded at the present stage. Further, since the metal endless belt is formed by jointing metallic extended thin plates by welding into an endless belt-like form, it is required to process the belt smoothly so that unevenness at the joint will not influence the sheet.

Further, even if the smooth processing is applied, since the welding material and the material of the belt are heterogeneous materials, corrosion is likely to occur at the joint of the metal endless belt, and since the welded portion is slightly different from other portions in the rigidity and thermal strain, its smoothness tends to be different from other portions.

The apparatus disclosed in JP-A-7-40370 does not invite such a trouble, and does not cause inclusion of air at the time of casting, and makes it possible to produce a sheet-like product or the like, of which the surface is uniform to some extent and has a highly mirror-finished property and which has a smooth or appropriately patterned surface. However, only by moving a pair of the belt rollers close to or away from the casting roller by forward or rearward movement of the slide frame, the casting belt is not necessarily located to an appropriate position to face the casting roller, and in addition, it is not easy to accurately and finely adjust the pressing force of respective belt rollers independent of the positional adjustment of the belt rollers.

Further, the synthetic resin material is, by its nature, classified into a synthetic resin material such as acryl which tends to firmly adhere to the casting drum or the casting roller, and a synthetic resin material such as polypropylene which is relatively easily peeled off. However, with conventional apparatuses, the length for nipping and pressing the molten synthetic resin material with the casting belt and the casting roller is substantially constant, and thus, although it depends on the resin material, the time for nipping and pressing is so long that the sheet or film is hardly peeled off from the roller, whereby workability will not be improved, or the time for contacting the roller becomes short, by which adequate gloss can not be obtained.

Under such circumstances, an object of the present invention is to provide a method for producing a thermoplastic synthetic resin sheet or film, and an apparatus for it, by which the production apparatus can be made small in size and easy in handling, and a sheet or film excellent in gloss and smoothness can be obtained.

Another object of the present invention is to provide a method for producing a thermoplastic synthetic resin sheet or film, and an apparatus therefor, in which even if the type of the synthetic resin material is changed, the sheet or film can be easily peeled off from the casting drum or the casting roller, and at the same time, adequate gloss can be obtained.

DISCLOSURE OF INVENTION

The present invention provides a method for producing a thermoplastic synthetic resin sheet or film by cold-rolling a synthetic resin material continuously supplied and fed from a die to produce a thermoplastic synthetic resin sheet or film of a predetermined thickness, which comprises:

supplying and feeding a synthetic resin material between an outer peripheral surface of a rotating metallic casting roller of which the outer peripheral surface is mirror finished; and a flexible tubular metallic seamless casting sleeve of which the outer surface is mirror finished and which is entrained around support rollers facing the outer peripheral surface of the casting roller and a support roller located away from the casting roller so that the casting sleeve circulates in contact with in an arcuate form along a part of the outer peripheral surface of the casting roller;

continuously casting a thermoplastic synthetic resin sheet or film by nipping and pressing by the casting roller and the casting sleeve; and preliminarily adjusting the distance for nipping and pressing the sheet or film by the casting roller and the casting sleeve in accordance with the peeling resistance of the synthetic resin material, in a circumferential direction along the outer peripheral surface of the casting roller. By using this method, it is possible to cast a thermoplastic synthetic resin sheet or film by the pressing force between the casting roller and the flexible tubular metallic seamless casting sleeve of which the outer surface is mirror finished. Accordingly, a thermoplastic synthetic resin sheet or film having a mirror finished or nearly mirror finished surface can be formed only by adjustment of the pressing force without inclusion of air at the time of casting; the thickness after casting, the surface smoothness and the specular gloss are substantially uniform, and gloss is high; and a thermoplastic synthetic resin sheet or film can be produced stably and continuously. Further, in the present invention, the synthetic resin material means a softened synthetic resin material in a thermoplastic state, and the die means an extrusion casting die, especially a T-die.

Further, the distance for nipping and pressing the sheet or film is adjustable along the outer peripheral surface of the casting roller in the circumferential direction. Accordingly, even if the type of the film or sheet is changed, the nipping and pressing distance can be adjusted depending upon the type, whereby it is possible to prevent the thermoplastic synthetic resin sheet or film from being firmly adhered and hardly peeled.

In a case of, for example, acryl, where the peeling resistance from the outer peripheral surface of the casting roller and the surface of the casting roller are large, it is possible to adjust the distance for nipping and pressing the sheet or film to be short by use of the casting roller and the casting sleeve, prevent the thermoplastic synthetic resin sheet or film from being firmly adhered to and hardly peeled from the outer peripheral surface of the casting roller and the surface of the casting roller, and draw the cast glossy thermoplastic synthetic resin sheet or film from the outer peripheral surface of the casting roller.

Further, unlike the above case, in a case of, for example, polypropylene where the peeling resistance from the outer peripheral surface of the casting roller and the surface of the casting sleeve are small, the distance for nipping and pressing the sheet or film by use of the casting roller and the casting sleeve can be increased so as to secure a sufficient time for imparting the gloss and improve the productivity, whereby the thermoplastic synthetic resin sheet or film will not be firmly adhered to the outer peripheral surface of the casting roller and the surface of the casting sleeve, and the cast glossy thermoplastic synthetic resin sheet or film can be drawn from the outer peripheral surface of the casting roller.

Namely, it is possible to always appropriately draw the cast glossy thermoplastic synthetic resin sheet or film from the outer peripheral surface of the casting roller, without fusing.

Further, in an embodiment of the present invention, the adjustment of the distance for nipping and pressing the sheet or film with the casting sleeve is carried out by rotating the second support roller facing the casting roller at the downstream side, around the first support roller facing the casting roller near the die in such a direction that the second support roller moves close to or away from the casting roller. Accordingly, by rotating the second support roller around the first support roller, the distance for nipping and pressing the sheet or film can be easily adjusted during the processing.

Further, in an embodiment of the present invention, the thermoplastic synthetic resin sheet or film continuously cast by the nipping and pressing between the casting roller and the casting sleeve is immediately introduced into a cooling tank to cool it, and after completely cooling and solidifying it, a cooling liquid adhered on the surface of the sheet is removed, and then the sheet or film is subjected to a reheating treatment within a range of from −40° C. to +15° C. of a heat deformation temperature of the sheet or film to a degree such that a thermal strain of the sheet or film can be corrected. By this embodiment, the thermoplastic synthetic resin sheet or film is cooled at once, whereby its transparency can be improved and a product having no distortion can be obtained.

Further, in an embodiment of the present invention, the pressing force of the surface of the casting sleeve against the outer peripheral surface of the casting roller is adjusted by moving the third support roller which is not facing the casting roller among the support rollers. By this embodiment, even if the distance for nipping and pressing is changed, the pressing force can be independently and simply adjusted, and the above effects can be significantly achieved, by which the thickness of the cast thermoplastic synthetic resin sheet or film can easily be corrected or changed.

In an embodiment of the present invention, the outer peripheral surface of the first support roller facing the outer peripheral surface of the casting roller near the die is covered by an elastic layer. Accordingly, fluctuation of the thickness of the synthetic resin material can appropriately be absorbed by deformation of the elastic layer.

The present invention also provides an apparatus for producing a glossy thermoplastic synthetic resin sheet or film of a predetermined thickness from a synthetic resin material continuously supplied and fed from a die by use of a casting mechanism provided with a metallic casting roller, characterized in that the casting mechanism comprises: a casting roller rotatably supported by a frame; a metallic flexible casting sleeve which circulates in contact with in an arcuate form along a part of the outer peripheral surface of the casting roller, and nips and presses the sheet or film in cooperation with the casting roller; and at least three support rollers which support the casting sleeve so as to make circulation movement of the casting sleeve possible, wherein the casting sleeve is seamless and its outer peripheral surface is mirror finished; among the support rollers, a first support roller faces the casting roller near the die, a second support roller faces the casting roller at the downstream side, and the second support roller is provided rotatably around the first support roller relative to the casting roller, a third support roller is located away from the casting roller, the second support roller is provided movably so that it can adjust the distance for nipping and pressing the sheet or film by the casting roller and the casting sleeve i.e. the distance where the sheet or film under processing is in a close contact with the casting roller and the casting sleeve. By using this apparatus, the production method of the present invention can be securely practiced.

Further, in an embodiment of the present invention, the second support roller is provided at the free end side of a support lever pivotally mounted around the same axis as the first support roller so that the support roller is moved by rotating the support lever by an adjusting means. By this embodiment, the second support roller can easily be moved. And, by providing a feed screw mechanism between the frame and the support lever as the adjusting means, the adjustment can further easily be made.

Further, in an embodiment of the present invention, the first, second and third support rollers are located at apexes of a triangle, and the third support roller is located on the frame so that the support roller is movable away from the outer peripheral surface of the casting roller so as to adjust the tension of the casting sleeve, whereby the pressing force can easily be adjusted, the apparatus can be made totally small in size as compared with conventional apparatuses, and the casting sleeve can easily be replaced with new one.

In an embodiment of the present invention, among the support rollers, the first support roller facing the outer peripheral surface of the casting roller near the die, is covered on its outer peripheral surface with an elastic layer of rubber, an elastomer or the like having thermal resistance and elasticity, whereby the fluctuation of the thickness of the thermoplastic synthetic resin sheet or film supplied from the die can be absorbed.

Further, in an embodiment of the present invention, the third support roller is provided on the frame in parallel or nonparallel to the first and second support rollers in such a manner that the distance between the axes of the rollers are changeable, whereby by moving the third support roller to the inside of the casting sleeve to loosen the tension of the casting sleeve, the casting sleeve abraded in use can be detached from these support rollers and replaced with new one, and in addition, when the casting sleeve is eccentrically arranged and the thickness of the thermoplastic synthetic resin sheet or film becomes irregular, one end of the third support roller is slanted in such a direction that the eccentric arrangement can be corrected, whereby the eccentric arrangement of the casting sleeve can easily be corrected.

In an embodiment of the present invention, the diameter of the casting roller is from 1 to 3 times the diameter of the first support roller, and the diameter of the first support roller is from 1 to 1.5 times the diameter of the second support roller and the diameter of the third support roller, whereby these support rollers can be located near the outer peripheral surface of the casting roller, a thermoplastic synthetic resin sheet or film can be produced by a predetermined pressing force without enlarging the size of the casting sleeve, and the apparatus can be made totally small and operated with low costs.

In an embodiment of the present invention, the casting sleeve is made of nickel and formed by a seamless process, and has a thickness of 0.2 to 0.5 mm and a diameter of 400 to 1,000 mm, whereby the above-mentioned effects can further significantly obtained.

In an embodiment of the present invention, the diameters of the support rollers are from 600 to 1,000 times the thickness of the casting sleeve, whereby excessive deformation by bending will not be caused, and the useful life time of the casting sleeve will be lengthened. If this value is less than 600 times, the useful life time will become extremely short, and if this value exceeds 1,000 times, the apparatus will become large in size, such being not advisable.

Further, in an embodiment of the present invention, at the downstream side of the second support roller facing the casting roller, sequentially provided are a cooling tank for immersing the thermoplastic synthetic resin sheet or film; a draining means for draining water on the surface of the sheet or film; and a sheet-correcting and -heating device (37) for a reheating treatment within a range of from −40° C. to +15° C. of a heat deformation temperature of the sheet or film to a degree such that a thermal strain of the sheet or film can be corrected, whereby, the film or sheet can be cooled further rapidly, the transparency can further be improved, and products having no distortion can be produced. Further, in a case of a non-crystalline synthetic resin sheet or film for which no transparency is required, for example, polycarbonate, the sheet or film can be supplied directly to a secondary processing apparatus from the casting roller.

Further, in an embodiment of the present invention, the cooling tank is provided on the frame in an elevationally adjustable fashion, the sheet-correcting and -heating device. is provided on another frame which is connectable to the frame, and the frames are movable on an installation face, whereby it becomes easy to provide the die with the casting apparatus, the cooling tank and the sheet-correcting and -heating device, and further, when the cooling tank is not necessary, it can be retracted from the passage of the film or sheet. Further, by retracting the cooling tank, it will not interfere the preparation before the start of operation and the workability will be high.

With respect to polypropylene as one type of the thermoplastic synthetic resin to be used in the present invention, a crystalline propylene monopolymer, or a crystalline copolymer obtained by copolymerizing propylene with a comonomer other than propylene, such as ethylene or butene, and a mixture thereof may be used. Further, to such polypropylene, an antioxidant, lubricant, an antistatic agent, a slipping additive, an antiblocking agent, an ultraviolet absorber, a nucleating agent, a transparency-improving agent, an organic peroxide, a pigment, inorganic fillers such as talc or calcium carbonate, organic fillers such as wood flour or synthetic fibers, other thermoplastic synthetic resin such as polyethylene or ethylene propylene rubber, rubber and the like, may appropriately be added for use, as the case requires.

Further, as other thermoplastic synthetic resin, polyethylene, polystyrene, ABS, polyethylene, terephthalate, polybutylene terephthalate, polyamide, polycarbonate, vinyl chloride and the like may be used. In the foregoing, explanation has been made on the case of a single sheet, etc. However, the method for producing a sheet or film and the apparatus therefor of the present invention may be applied to production of a multi-layer sheet or a laminated sheet.

BRIEF DESCRIPTION OF THE DRAWINGS

FIG. 1 is a fundamental side view showing an example of the apparatus practicing the method of the present invention.

DETAILED DESCRIPTION OF THE PREFERRED EMBODIMENTS

Example 1

Figure 2:
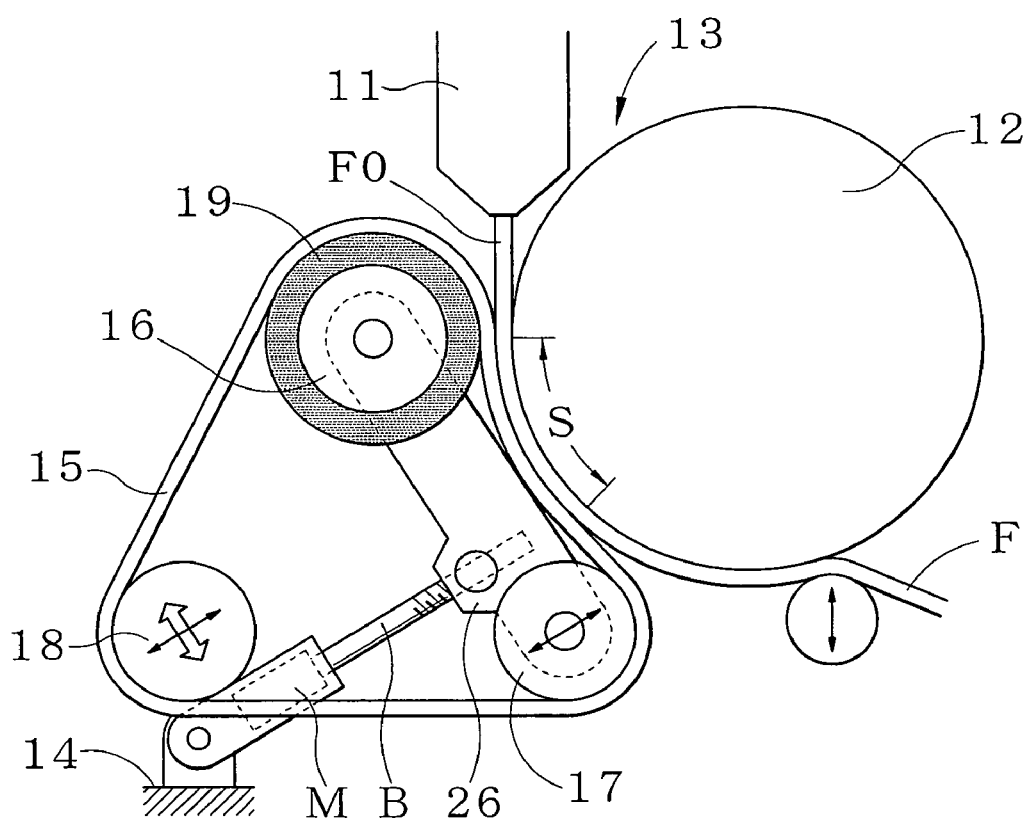
FIG. 2 is a side view of a casting mechanism part showing a supporting structure of the second support roller in FIG. 1.

Referring to FIG. 1 and FIG. 2, an apparatus 10 of the present invention is constructed as described below so that a synthetic resin material continuously supplied and fed from an extrusion casting die 11, i.e., a molten synthetic resin material FO heated to its heat deformation temperature, is subjected to cool-pressing with a casting mechanism 13 provided with a casting roller 12 to produce a glossy thermoplastic synthetic resin sheet or film F of a predetermined thickness.

The casting mechanism 13 comprises a casting roller 12 rotatably and horizontally supported by a frame 14; a flexible tubular metallic seamless casting sleeve 15 of which the outer surface is mirror finished, which rotates in contact with in an arcuate form a part of the outer peripheral surface of the casting roller 12 and nips and presses the synthetic resin material FO continuously supplied from the extrusion casting die 11 together with the casting roller 12; and a first support roller 16 and a second support roller 17 which face the outer peripheral surface of the casting roller 12 and are capable of adjusting the pressing force between the casting roller 12 and the surface of the casting sleeve 15. The casting roller 12 is also provided on the frame 14 so that it is movable close to or away from the support rollers 16, 17 (see FIG. 3).

Further, as the casting sleeve 15, one manufactured by Dimuco Co. was used, and as is defined in Claim 1 of JP-A-2001-330081, this is produced by subjecting a metallic cylindrical simple tube for which thermoplastic processing is applicable to a thin-wall treatment to reduce the thickness to a predetermined level, and then cutting the thin-walled cylindrical simple tube to a desired width to form a ring-like product.

The casting sleeve 15 has a structure wherein three metallic support rollers 16, 17, 18 each having a horizontal axial line, including a third support roller 18 located away from the casting roller 12, are located at apexes of a triangle and the casting sleeve 15 is entrained around the respective rollers in a triangle form, and the casting sleeve 15 faces the outer peripheral surface of the casting roller 12 in an arcuate form at a portion along the outline of the outer peripheral surface of the casting roller 12. Further, the support rollers may be constituted by 4 or more rollers.

The frame 14 is designed to have wheels and be movable on an installation face (including rails), and be fixed at the position at which centering of the casting mechanism 13 and the die 11 is made.

The tension of the casting sleeve 15 can be adjusted by adjusting the distances among the support rollers 16, 17, 18.

Figure 3:
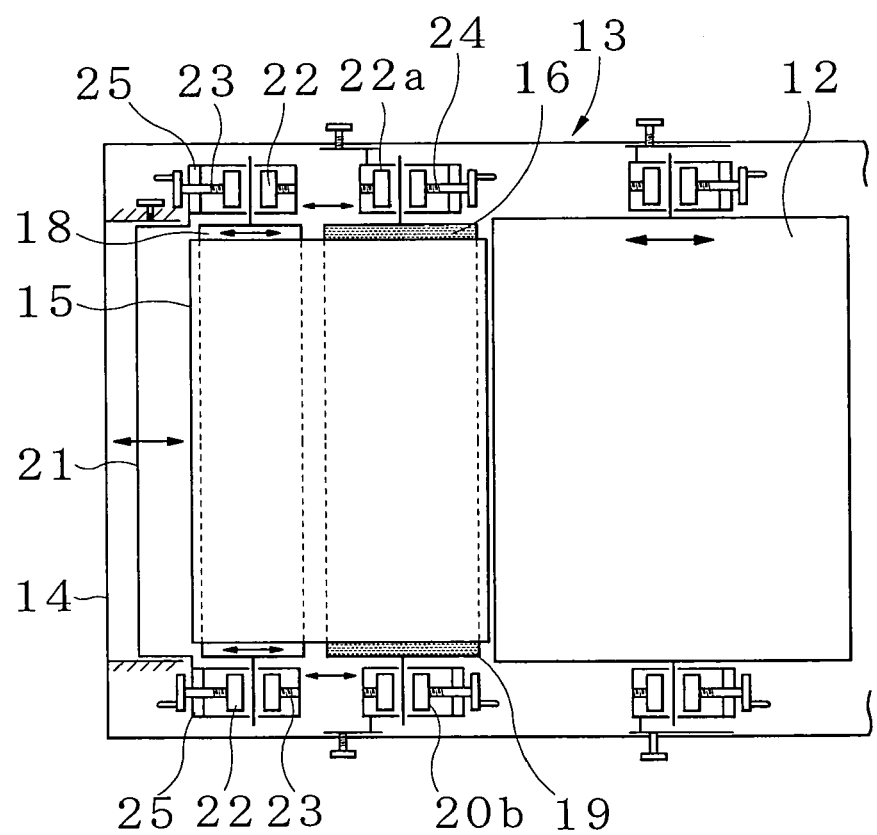
FIG. 3 is a plan view showing the mechanism of the casting sleeve and the support part.

Among the support rollers 16, 17, 18, the first support roller 16 near the die 11 is on its outer peripheral surface covered with an elastic layer 19 made of rubber or elastomer having heat resistance and elasticity; provided on the frame 14 so that it faces the outer peripheral surface of the casting roller 12 and is rotatable around the horizontal axial line thereof; and as indicated in FIG. 3, bearings 20a, 20b are provided so that these are finely adjustable to move close to or away from the casting roller 12.

The distance for nipping and pressing the sheet or film, that is, a distance S where the sheet or film under processing is in closely contact with the casting roller 12 and the casting sleeve 15, is designed to be adjustable in a circumferential direction along the outer peripheral surface of the casting roller 12. In this example, the second support roller 17 located at a distance in the downstream side from the first support roller 16, is provided in a direction to move close to or away from the outer peripheral surface of the casting roller 12 around the first support roller 16.

Specifically, as indicated in FIG. 2, the second support roller 17 is provided so that it will be movable in a direction to move close to or away from the outer peripheral surface of the casting roller 12, via an adjusting means, for example, a feed screw mechanism including an electric motor M, usually a ball screw mechanism B, wherein a bearing of the second support roller 17 is supported at the free end side of a support lever 26, of which the basal portion is pivotally mounted around the same axis as the axis of the first support roller 16, so that the support lever 26 is rotated around the horizontal axial line of the pivotally mounted basal portion. As the adjusting means, in addition to the electric motor M and the feed screw B, a pneumatic or hydraulic cylinder actuator, a rotation mechanism of the support lever 26 by use of a degree of insertion of cotter, and the like, maybe used. Otherwise, even by a manual operation, no substantial change is brought about in the present invention.

The third support roller 18 is provided on the frame 14 so that its position is changeable, for correction of the eccentric arrangement and deformation of the casting sleeve 15.

Within the casting sleeve 15, the third support roller 18 is arranged in parallel or nonparallel to the other support rollers 16, 17 while keeping its axial line horizontally, and the distances between axes from these rollers can be changed or fixed. Although its mechanism is not particularly restricted, for example, the bearings at both sides of the third support roller 18 are all together supported by a support block 21 pivotally mounted on the frame 14 so that it can be widely moved close to or away from the other support rollers, and finely adjustable in parallel or nonparallel to the other support rollers 16, 17 for each side of the support block 21 corresponding to the left or right bearing 22. Further, the third support roller 18 takes a part of a tension roller for adjusting the tension of the casting sleeve.

The diameter of the casting roller 12 is about 1 to 3 times the diameter of the first support roller 16, and in the example indicated in the figure, it is about 1.6 times. The diameter of the first support roller 16 is 1 to 1.5 times the diameter of the second support roller 17 and the diameter of the third support roller 18, and in the example indicated in the figure, it is about 1.25 times. However, the present invention is not particularly restricted to this diameter ratio.

The casting sleeve 15 is made of nickel and formed by a seamless process, and has a thickness of about 0.2 to 0.5 mm and a diameter of about 400 to 1,000 mm, and in the example, the thickness is about 0.3 mm and the diameter is about 500 mm.

With respect to the above dimension, the one having the diameters of the support rollers 16, 17 and 18 of 250, 200 and 200 mm, respectively, is sufficient for practical use, and when the thickness is 0.3 mm, the casting sleeve 15 is deformed adequately and undergoes elastic deformation without overloading the peripheral surfaces of the support rollers 16, 17 and 18, and can adequately endure the repeated bending stress.

As the material for the casting sleeve, instead of the one made of nickel, other nickel alloy, stainless steel, titanium alloy or the like may be used. Further, the thicknesses of the casting sleeve 15 and the film or sheet under processing in FIG. 2 are illustrated exaggeratingly for convenience in explanation.

In the casting mechanism 13, although omitted in the figure, a temperature-adjusting mechanism for heating or cooling the synthetic resin material FO is provided at an appropriate position, by which the temperature of the casting roller 12 and the circulated casting sleeve 15 is adjusted, whereby the temperature control of the synthetic resin material FO becomes possible. The temperature adjustment of the casting sleeve 15 may be made by providing a temperature-adjusting mechanism for heating or cooling in the support rollers 16, 17, 18. Further, in the casting sleeve 15, an apparatus for blowing a temperature-controlled air may be additionally provided.

In production of the sheet or film by use of the above apparatus, prior to the casting, the frame 14 is moved on the installation face, centering of the casting mechanism 13 and the resin-ejecting port of the die 11 is conducted, and at the centering position, the frame 14 is fixed to the installation face with an appropriate fixing means.

The outer peripheral surface of the casting roller 12 and the casting sleeve 15 entrained in a triangle form around the support rollers 16, 17, 18, are brought into contact to each other at a section between the first support roller 16 and the second support roller 17, the first support roller 16 and the second support roller 17 are moved close to the casting roller 12, the positions thereof are finely adjusted depending upon the thickness, material and the like of the film or sheet, and the third support roller 18 is moved away from the first and second support rollers 16, 17 to impart a desired tension to the casting sleeve 15. Then, the synthetic resin material FO is supplied and fed from the die 11 into the gap between the casting roller 12 and the casting sleeve 15 circulating and moving in contact with the casting roller 12, and by the nipping and pressing by use of the casting roller 12 and the casting sleeve 15, a thermoplastic synthetic resin sheet or film F is continuously cast.

Further, by the elastic layer 19 and the deformation of the casting sleeve 15 at the section between the first support roller 16 and the second support roller 17, the pressing force can be adjusted, and even if an irregular thickness portion or a partly irregular thickness portion exists within this section, the synthetic resin material FO extruded from the extrusion casting die 11 is fed into the gap between the casting roller 12 and the casting sleeve 15 by the deformation of the elastic layer 19, whereby the material is pressed into a uniform thickness.

In a case where the type of the synthetic resin material constituting the film or sheet F is changed to, for example, acryl which presents a large peeling resistance from the outer peripheral surface of the casting roller 12 and the surface of the casting sleeve 15, the second support roller 17 is moved away from the outer peripheral surface of the casting roller 12 by rotating the support lever 26 by use of the adjusting means, by which the nipping and pressing distance of the thermoplastic synthetic resin sheet or film by the outer peripheral surface of the casting roller 12 and the surface of the casting sleeve 15 i.e. the distance S where the sheet or film under processing is in closely contact with the casting roller 12 and the casting sleeve 15 (see FIG. 2) is adjusted to be short, whereby it is possible to prevent the thermoplastic synthetic resin sheet or film from being firmly adhered to and hardly peeled from the outer peripheral surface of the casting roller 12 and the surface of the casting sleeve 15, and draw the cast thermoplastic synthetic resin sheet or film from the outer peripheral surface of the casting roller 12.

Further, on the contrary, in a case of, for example, polypropylene, where the peeling resistance from the outer peripheral surface of the casting roller 12 and the surface of the casting sleeve 15 is small, the second support roller 17 is moved close to the outer peripheral surface of the casting roller 12, by which the nipping and pressing distance S of the thermoplastic synthetic resin sheet or film by the outer peripheral surface of the casting roller 12 and the surface of the casting sleeve 15 is adjusted to be long, whereby sufficient time for imparting gloss is ensured and the productivity is improved.

In a case where the thickness of the sheet or film F is changed, if the width is kept the same, it is advisable to change the extrusion amount per unit time, and therefore, the distance at a part of nipping and pressing by the casting roller 12 and the casting sleeve 15 is changed, and correspondingly, the positions of the first and second support rollers 16 and 17 against the casting roller 12 are finely adjusted for change of the extrusion amount per unit time.

Namely, when a thin sheet or film F is cast, these support rollers 16, 17 are moved close to the casting roller 12 to narrow the gap between the casting roller 12 and the casting sleeve 15, and when a thick sheet or film F is cast, the extrusion amount per unit time from the die 11 is increased, and the first and second support rollers 16 and 17 are moved away from the casting roller 12 correspondingly.

Since the support roller 16 has an elastic layer 19 on its surface, it will receive a resistance from the synthetic resin material FO under processing during the casting, and this elastic layer 19 undergoes elastic deformation, and a gap for absorbing the fluctuation of the thickness of the synthetic resin material is formed between the casting roller 12 and the casting sleeve 15. When no load is applied before processing, it is advisable to prevent the casting roller 12 from contacting the casting sleeve 15 to prevent formation of scars or the casting roller 12.

The movement of the support rollers 16, 17 and 18 and the bearings 20, 22 is preferably made by fine adjustment with an electric motor of which the feed screws 23, 24 are connected to them via a reduction gear mechanism. However, the adjustment may be made by a pneumatic or hydraulic cylinder actuator, a degree of insertion of cotter, and the like, and the gap between the casting sleeve 15 and the casting roller 12 can likewise be adjusted. Further, the feed screws 23, 24 and cotter may be actuated by the above actuating means. In addition, even by a manual operation, no substantial change is brought about in the present invention.

Further, in a case where the casting sleeve 15 eccentrically exists to one side on the three support rollers 16, 17, 18 during casting, it is advisable to adjust the degree of parallelization of the axial line of the third support roller 18 and the axial lines of other support rollers 16, 17, to correct the eccentric arrangement of the casting sleeve 15.

Namely, the tendency that the casting sleeve 15 shifts towards the low resistance side is unavoidably caused by slight temperature difference between left and right sides of the synthetic resin material FO layer to be supplied, slight difference in the degree of parallelization of support rollers 16, 17, 18, the difference in the resistance to plastic deformation and the like. Accordingly, in usual, correction is made by, for example, bringing the side edge of the casting sleeve 15 into contact with a guide, but by such a method, the casting sleeve is damaged.

In the present invention, by slightly changing the degree of parallelization of the axial line of the third support roller 18 relative to the other support rollers 16, 17, an effect of, for example, a type of a turn bar is generated, the position of the casting sleeve 15 can be easily returned correctly to the center of the support rollers 16, 17 and 18. When the position of the casting sleeve 15 is returned to the center position, the third support roller 18 may be returned to the angle at which the casting sleeve 15 will maintain the center position of the three support rollers 16, 17 and 18.

The casting sleeve 15 can always be kept at the correct position by detecting the position of the side edge of the casting sleeve 15 with a line regulator, and corresponding to this detected value, changing the axial direction of the third support roller 18.

In order to exhibit the effect like the turn bar, a block guide 25 of the third support roller 18 is provided so that it may be moved or adjusted to upper and lower directions (see white arrow) with the left and right sides being adjustable independently, and may be fixed, in FIG. 2.

Further, in a case where the thicknesses of the left and right sides of the cast film F are different, the distance where the left and right bearings 20a, 20b of the first and second support rollers 16 and 17 are close to the casting roller 12 may be finely adjusted for correction.

Then, in a case where the casting sleeve 15 is abraded in use and replaced with new one, the third support roller 18 is moved largely to the inside of the casting sleeve 15 to loosen the tension of the casting sleeve 15, and the casting roller 12 is moved away from the support rollers 16, 17, and then the support rollers 16, 17 and 18 are cantilevered, and the casting sleeve 15 is detached from the support rollers 16, 17, 18 and replaced with new one.

Further, in the explanation of this example, a case where the synthetic resin material FO is fed along the vertical direction from the die 11 i.e. a vertical extrusion system is explained. However, this example can likewise be carried out in a case where the material is fed along the horizontal direction i.e. lateral extrusion system.

Example 2

Figure 4:
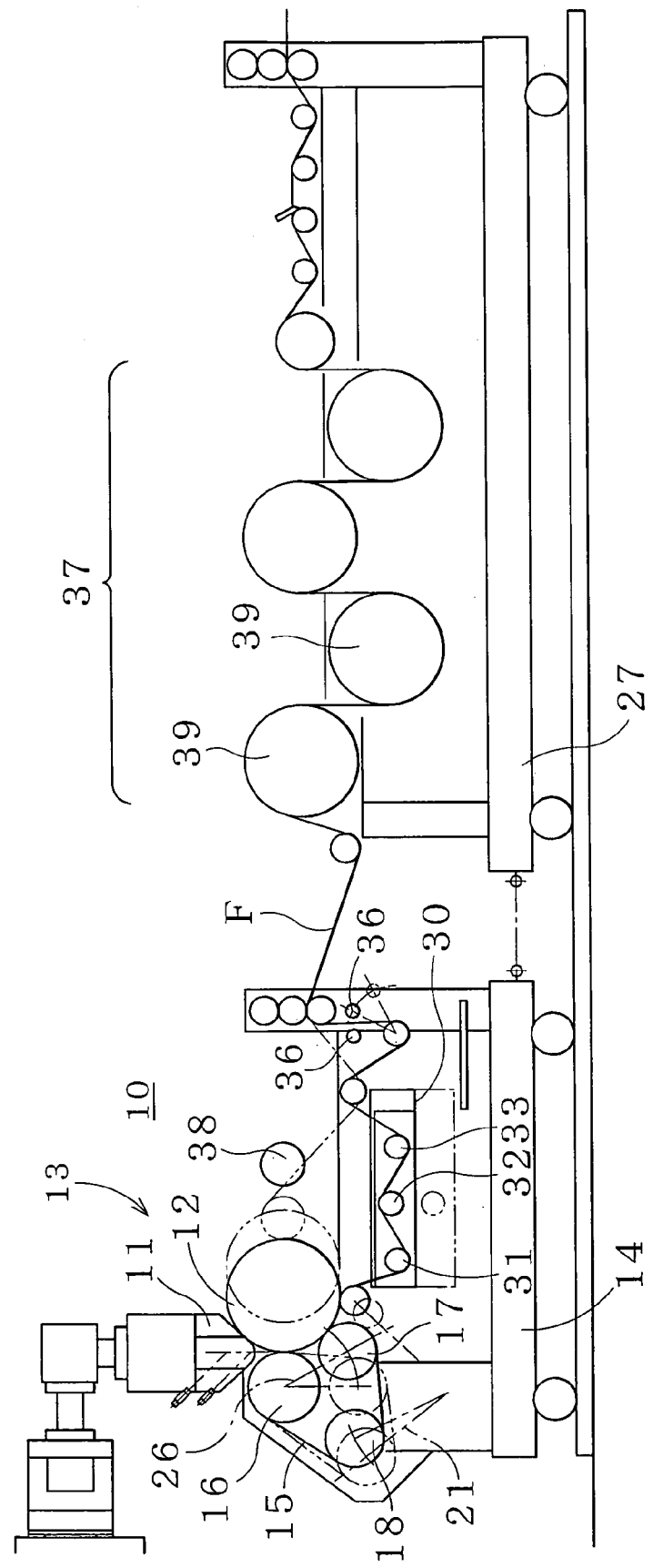
FIG. 4 is a fundamental side view showing the mechanism of another example including a cooling device of a post treatment step.

This example is used as a post treatment of the production apparatus indicated in the above example; and as indicated in FIG. 4, a cooling tank 30 for immersing a thermoplastic resin sheet or film F is provided close to the downstream side of the second support roller 17 facing the casting roller 12; and at the downstream side of the cooling tank 30, a draining blower 36 as a draining means for draining water on the cooled sheet or film F. At the further downstream side of the draining blower 36, is provided a sheet-correcting and -heating device 37 having a plurality of heating rollers 39 for a reheating treatment within a range of from −40° C. to +15° C. of a heat deformation temperature of the sheet or film F to a degree such that a thermal strain of the sheet or film F can be corrected. The cooling tank 30 is provided on the frame 14 so that the cooling tank is movable upward and downward, the sheet-correcting and -heating device 37 is provided on another frame 27 which is connectable to the frame 14, and the frames 14, 27 are movable on an installation face and fixed at a predetermined position.

In the water of the cooling tank 30, a plurality of guide rollers 31, 32, 33 are provided, and the film or sheet F is entrained around the rollers in a zigzag fashion and sequentially cooled.

Further, at the upper side of the cooling tank 30, guide rollers 38 are provided to form a passage through which the film or sheet F usually does not pass, and by permitting the sheet or film F to pass through the guide rollers 38, the sheet or film can be sequentially reheated for annealing treatment without cooling in water.

After nipping and pressing by the casting roller 12 and the casting sleeve 15, by directly immersing the glossy film or sheet F of which the surface is nearly mirror finished in a cooling tank 30 for cooling, the transparency of the film or sheet F can further be improved.

For the one for which no transparency is required, the film or sheet F is permitted to pass through the guide rollers 38 and supplied to the sheet-correcting and -heating device 37 without passing it through the cooling tank 30, for reheating treatment of the film or sheet F.

Further, one other than a crystalline thermoplastic synthetic resin film or sheet, may sometimes be supplied directly to a secondary processing apparatus (not shown in the figure) without passing it through the cooling tank 30 and the sheet-correcting and -heating device 37.

According to the present invention, it is possible to obtain an apparatus being small in size and easy to handle, and cast a thermoplastic synthetic resin sheet or film stably and continuously. Further, even if the type of the synthetic resin material is changed, the sheet or film can be efficiently produced by preliminarily adjusting the nipping and pressing distance i.e. the distance where the sheet or film under processing is in closely contact with the casting roller and the casting sleeve, depending upon the degree of the peeling resistance to the casting roller or casting sleeve. Accordingly, it is possible to obtain a sheet or film excellent in gloss and smoothness from various types of synthetic resin materials.

The invention claimed is:

1. A method for producing a thermoplastic synthetic resin sheet or film by cold-rolling a synthetic resin material continuously supplied and fed from a die to produce a thermoplastic synthetic resin sheet or film of a predetermined thickness, comprising the steps of:

supplying and feeding a synthetic resin material between an outer peripheral surface of a rotating metallic casting roller and a flexible tubular metallic seamless casting sleeve entrained around first and second support rollers confronting the outer peripheral surface of the casting roller and a third support roller disposed at a greater distance from the outer peripheral surface of the casting roller than the first and second support rollers so that the casting sleeve circulates along an arcuate path while contacting a part of the outer peripheral surface of the rotating casting roller;

continuously casting a thermoplastic synthetic resin sheet or film by nipping and pressing the synthetic resin material with the casting roller and the casting sleeve; and adjusting a distance for nipping and pressing the synthetic resin material by the casting roller and the casting sleeve in a circumferential direction along the outer peripheral surface of the casting roller and in accordance with a peeling resistance of the synthetic resin material;

wherein the step of adjusting a distance for nipping and pressing the synthetic resin sheet or film with the casting sleeve is carried out by rotating the second support roller confronting the casting roller at the downstream side, around the first support roller confronting the casting roller near the die in such a direction that the second support roller is moved toward and away from the casting roller.

2. The method for producing a thermoplastic synthetic resin sheet or film according to claim 1; wherein the outer peripheral surface of the first support roller facing the casting roller near the die is covered by an elastic layer, and fluctuation of the thickness of the synthetic resin material is absorbed by deformation of the elastic layer.

3. An apparatus f or producing a thermoplastic synthetic resin sheet or film by cold-rolling a synthetic resin material continuously supplied and fed from a die to produce a glossy thermoplastic synthetic resin sheet or film of a predetermined thickness, the apparatus comprising: a casting mechanism having a frame; a metallic casting roller supported by the frame for undergoing rotation; a flexible and seamless metallic casting sleeve having a mirror-finished outer peripheral surface and being mounted for undergoing rotational movement along an arcuate path while contacting a part of an outer peripheral surface of the casting roller to nip and press a synthetic resin material supplied therebetween; and at least three support rollers for rotating the casting sleeve and comprised of first, second and third support rollers; wherein the first support roller confronts the casting roller near a die, the third support roller is disposed at a greater distance from the casting roller than the first and second support rollers, and the second support roller confronts the casting roller at the downstream side and is mounted for undergoing rotational movement around the first support roller relative to the outer peripheral surface of the casting roller to adjust a distance between the casting roller and the casting sleeve during nipping and pressing of the synthetic resin material supplied therebetween, and wherein the second support roller is provided at the free end side of a support lever pivotally mounted around the same axis as the first support roller so that the second support roller is moved by rotating the support lever by an adjusting means.

4. The apparatus for producing a thermoplastic synthetic resin sheet or film according to claim 3; wherein the adjusting means is a feed screw mechanism provided between the frame and the support lever.

5. The apparatus for producing a thermoplastic synthetic resin sheet or film according to. claim 3; wherein among the support rollers, the first support roller facing the outer peripheral surface of the casting roller near the die, is covered on its outer peripheral surface with an elastic resistance and elasticity.

6. The apparatus for producing a thermoplastic synthetic resin sheet or film according to claim 3; wherein the casting sleeve is made of nickel and formed by a seamless process, and has a thickness of 0.2 to 0.5 mm and a diameter of 400 to 1,000 mm.

7. A method for producing a thermoplastic synthetic resin sheet or film by cold-rolling a synthetic resin material continuously supplied and fed from a die to produce a thermoplastic synthetic resin sheet or film of a predetermined thickness, comprising the steps of:

supplying and feeding a synthetic resin material between an outer peripheral surface of a rotating metallic casting roller and a flexible tubular metallic seamless casting sleeve entrained around first and second support rollers confronting the outer peripheral surface of the casting roller and a third support roller disposed at a greater distance from the outer peripheral surface of the casting roller than the first and second support rollers so that the casting sleeve circulates along an arcuate path while contacting a part of the outer peripheral surface of the rotating casting roller;

continuously casting a thermoplastic synthetic resin sheet or film by nipping and pressing the synthetic resin material with the casting roller and the casting sleeve; and adjusting a distance for nipping and pressing the synthetic resin material by the casting roller and the casting sleeve in a circumferential direction along the outer peripheral surface of the casting roller and in accordance with a peeling resistance of the synthetic resin material;

wherein the step of adjusting a distance for nipping and pressing the synthetic resin sheet or film with the casting sleeve is carried out by rotating the second support roller confronting the casting roller at the downstream side, around the first support roller confronting the casting roller near the die in such a direction that the second support roller is moved toward and away from the casting roller; and wherein the thermoplastic synthetic resin sheet or film continuously cast by the nipping and pressing between the casting roller and the casting sleeve is immediately introduced into a cooling tank to cool it, and after completely cooling and solidifying it, a cooling liquid adhered on the surface of the sheet is removed, and then the sheet or film is subjected to a reheating treatment within a range of from −40° C. to +15° C. of a heat deformation temperature of the sheet or film to a degree such that a thermal strain of the sheet or film can be corrected.

8. An apparatus for producing a thermoplastic synthetic resin sheet or film by cold-rolling a synthetic resin material continuously supplied and fed from a die to produce a glossy thermoplastic synthetic resin sheet or film of a predetermined thickness, the apparatus comprising: a casting mechanism having a frame; a metallic casting roller supported by the frame for undergoing rotation; a flexible and seamless metallic casting sleeve having a mirror-finished outer peripheral surface and being mounted for undergoing rotational movement along an arcuate path while contacting a part of an outer peripheral surface of the casting roller to nip and press a synthetic resin material supplied therebetween; and at least three support rollers for rotating the casting sleeve and comprised of first, second and third support rollers; wherein the first support roller confronts the casting roller near a die, the third support roller is disposed at a greater distance from the casting roller than the first and second support rollers, and the second support roller confronts the casting roller at the downstream side and is mounted for undergoing rotational movement around the first support roller relative to the outer peripheral surface of the casting roller to adjust a distance between the casting roller and the casting sleeve during nipping and pressing of the synthetic resin material supplied therebetween, and wherein the second support roller is provided at the free end side of a support lever pivotally mounted around the same axis as the first support roller so that the second support roller is moved by rotating the support lever by an adjusting means, wherein at the downstream side of the second support roller facing the casting roller, sequentially provided are a cooling tank for immersing the thermoplastic synthetic resin sheet or film, draining means f or draining water on the surface of the sheet or film, and a sheet-correcting-and-heating device for a reheating treatment within a range of from −40° C. to +15° C. of a heat deformation temperature of the sheet or film to a degree such that a thermal strain of the sheet or film can be corrected.

9. The apparatus for producing a thermoplastic synthetic resin sheet or film according to claim 8; wherein the adjusting means is a feed screw mechanism provided between the frame and the support lever.

10. The apparatus for producing a thermoplastic synthetic resin sheet or film according to claim 8; wherein among the support rollers, the first support roller facing the outer peripheral surface of the casting roller near the die, is covered on its outer peripheral surface with an elastic resistance and elasticity.

11. The apparatus for producing a thermoplastic synthetic resin sheet or film according to claim 10; wherein the casting sleeve is made of nickel and formed by a seamless process, and has a thickness of 0.2 to 0.5 mm and a diameter of 400 to 1,000 mm.

\* \* \* \* \*